United States Patent
Morinaga et al.

(10) Patent No.: US 9,454,836 B2
(45) Date of Patent: Sep. 27, 2016

(54) OBJECT DISPLAY DEVICE AND OBJECT DISPLAY METHOD

(75) Inventors: Yasuo Morinaga, Chiyoda-ku (JP); Manabu Ota, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 11 days.

(21) Appl. No.: 13/882,030

(22) PCT Filed: Oct. 13, 2011

(86) PCT No.: PCT/JP2011/073550
§ 371 (c)(1),
(2), (4) Date: Apr. 26, 2013

(87) PCT Pub. No.: WO2012/063594
PCT Pub. Date: May 18, 2012

(65) Prior Publication Data
US 2013/0222424 A1    Aug. 29, 2013

(30) Foreign Application Priority Data
Nov. 8, 2010   (JP) .................................. 2010-249873

(51) Int. Cl.
| | | |
|---|---|---|
| G06T 11/60 | (2006.01) | |
| G06T 19/00 | (2011.01) | |
| G06K 9/46 | (2006.01) | |
| G06T 11/00 | (2006.01) | |

(52) U.S. Cl.
CPC ............ *G06T 11/60* (2013.01); *G06K 9/4652* (2013.01); *G06T 11/00* (2013.01); *G06T 19/006* (2013.01)

(58) Field of Classification Search
USPC ........................................................ 345/633
See application file for complete search history.

(56) References Cited

U.S. PATENT DOCUMENTS

| | | | | |
|---|---|---|---|---|
| 2002/0057280 | A1* | 5/2002 | Anabuki ............... | G02B 27/017 345/633 |
| 2003/0142068 | A1* | 7/2003 | DeLuca et al. ................ | 345/156 |
| 2004/0193331 | A1* | 9/2004 | Kashiwada ............ | G02B 27/01 701/1 |
| 2004/0233171 | A1* | 11/2004 | Bell ........................ | G06T 15/40 345/168 |
| 2004/0258297 | A1* | 12/2004 | Yeh et al. ..................... | 382/154 |

(Continued)

FOREIGN PATENT DOCUMENTS

| | | |
|---|---|---|
| CN | 101188677 A | 5/2008 |
| JP | 2-227340 A | 9/1990 |

(Continued)

OTHER PUBLICATIONS

English Machine Translation of JP2006262980.*

(Continued)

*Primary Examiner* — Barry Drennan
*Assistant Examiner* — Terrell Robinson
(74) *Attorney, Agent, or Firm* — Oblon, McClelland, Maier & Neustadt, L.L.P.

(57) ABSTRACT

In an object display device, a pattern extraction unit extracts a region where an object is easily visually recognized when the object is overlaid and displayed in an image in real space, from the image in real space, based on information about the size and color of the object and information about the color of the image in real space that are acquired by an image analysis unit, and a display position correction unit corrects the display position of the object to this region. This facilitates visual recognition of the object and enhances various effects, such as informativeness, brought about by the displaying of the object in the image in real space.

12 Claims, 12 Drawing Sheets

(a)

(b)

(56) References Cited

U.S. PATENT DOCUMENTS

| | | | | |
|---|---|---|---|---|
| 2005/0035980 | A1* | 2/2005 | Lonsing | G06T 15/00 |
| | | | | 345/633 |
| 2006/0086022 | A1* | 4/2006 | Would | G06F 3/0482 |
| | | | | 40/584 |
| 2007/0047809 | A1* | 3/2007 | Sasaki | 382/170 |
| 2007/0171453 | A1* | 7/2007 | Tamaru | 358/1.14 |
| 2008/0118156 | A1* | 5/2008 | Okada | 382/195 |
| 2008/0304735 | A1* | 12/2008 | Yang et al. | 382/164 |
| 2009/0202157 | A1* | 8/2009 | Zhang et al. | 382/224 |

FOREIGN PATENT DOCUMENTS

| | | |
|---|---|---|
| JP | 10-311732 A | 11/1998 |
| JP | 2006 262980 | 10/2006 |

OTHER PUBLICATIONS

Kurata, T. et al., "Augmented Reality (AR) Perspective 3: AR Interface," Joho Shori, Information Processing Society of Japan, vol. 51, No. 4, pp. 425 to 430 (Apr. 15, 2010) (with partial English translation).

International Search Report Issued Nov. 22, 2011 in PCT/JP11/73550 Filed Oct. 13, 2011.

International Preliminary Report on Patentability and Written Opinion issued May 23, 2013, in International Application No. PCT/JP2011/073550 (International filed Oct. 13, 2011).

Office Action issued Dec. 4, 2012, in Japanese Patent Application No. 2010-249873 with English translation.

Chinese Office Action issued Dec. 10, 2014, in China Patent Application No. 201180053268.6 (with English translation).

Office Action mailed Jul. 3, 2015, in Chinese Patent Application No. 201180053268.6 (with English-language translation).

Extended European Search Report issued on Jun. 3, 2016 in Patent Application No. 11840002.7.

Blaine Bell, et al., "View Management for Virtual and Augmented Reality", UIST 2001 (ACM Symp. on User Interface Software and Technology), XP-002655107, 2001, 10 Pages.

* cited by examiner

*Fig.3*

| OBJECT ID | OBJECT DATA | POSITION INFORMATION | POSITION DEPENDENCY |
|---|---|---|---|
| AAA | aaa.dat | $P_A$ | 0 |
| BBB | bbb.dat | $P_B$ | 1 |
| ⋮ | ⋮ | ⋮ | ⋮ |

*Fig.6*

| OBJECT ID | DISPLAY POSITION | NUMBER OF DISPLAY SQUARES | MAIN COLOR TONE |
|---|---|---|---|
| AAA | $(X_0, Y_0)$ | $3 \times 4$ | $(R_0, G_0, B_0)$ |

*Fig.8*

| DISPLAY CANDIDATE REGION | REGION INFORMATION | MAIN COLOR TONE |
|---|---|---|
| $A_1$ | $N_1, R_1$ | $(R_1, G_1, B_1)$ |
| $A_2$ | $N_2, R_2$ | $(R_2, G_2, B_2)$ |
| $A_3$ | $N_3, R_3$ | $(R_3, G_3, B_3)$ |

Fig.9
(a)
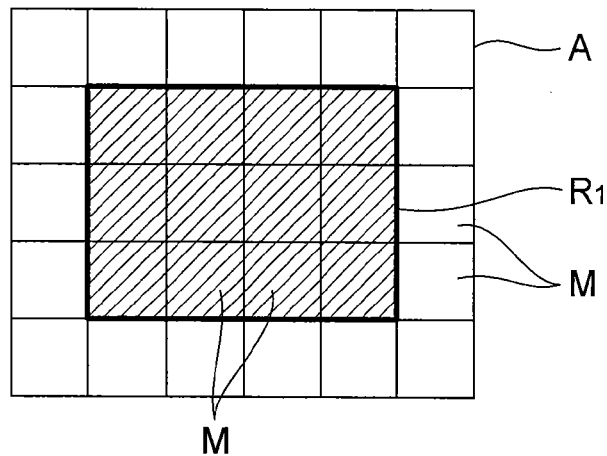
(b)
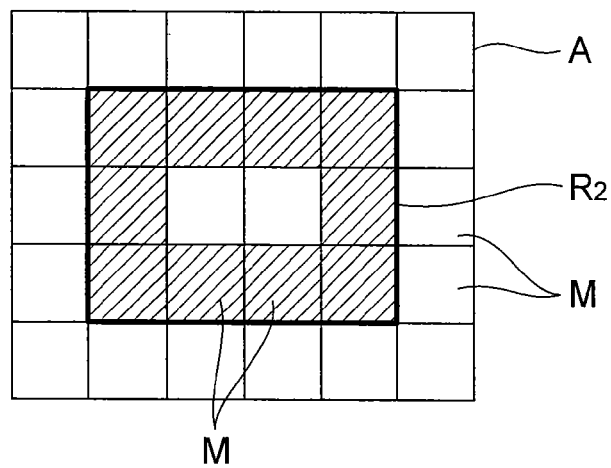
(c)
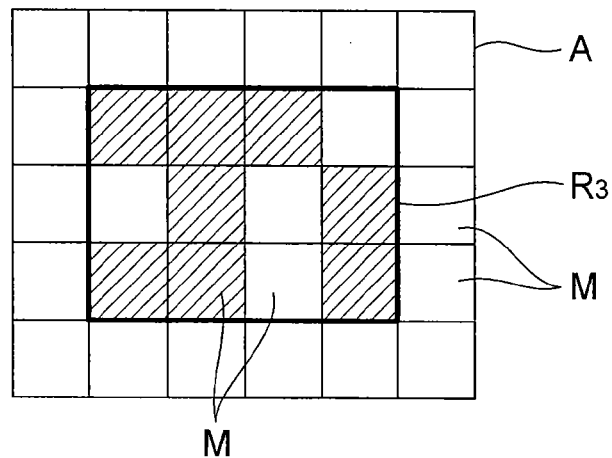

Fig.10
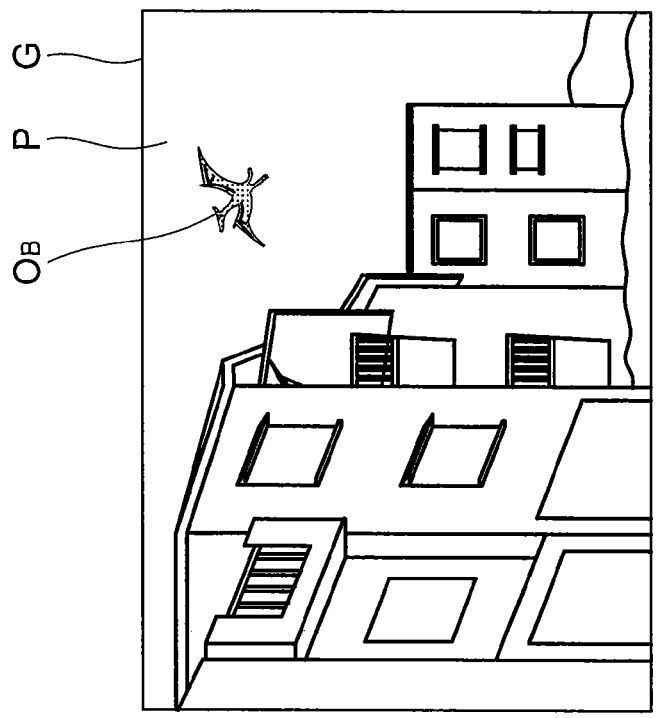
(b)
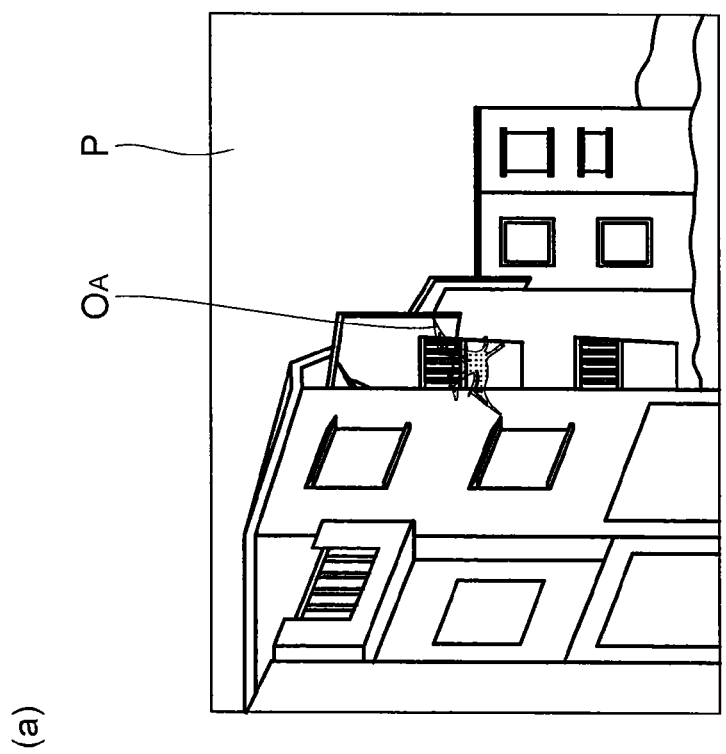
(a)

OBJECT DISPLAY DEVICE AND OBJECT DISPLAY METHOD

TECHNICAL FIELD

The present invention relates to an object display device and an object display method.

BACKGROUND ART

In recent years, services using AR (Augmented Reality) technology have been developed and provided. For example, a technique is known in which an object arranged around the location of a mobile terminal is acquired, and the object including a variety of information and images is overlaid and displayed on an image in real space acquired by a camera provided to the mobile terminal. A technique is also known in which a predetermined marker is detected from an image in real space acquired by a camera in a mobile terminal, and an object associated with the marker is overlaid on the image in real space and displayed on a display. In connection with the techniques described above, a device is known which detects a region in the flesh color from a captured image in real space and allows a virtual object (pet) to appear at the detected position (see, for example, Patent Literature 1).

CITATION LIST

Patent Literature

[Patent Literature 1] Japanese Patent Application Laid-Open Publication No. 2006-262980

SUMMARY OF INVENTION

Technical Problem

General AR technology, however, does not consider the state of an image around the display position of an object because the display position of the object is dependent on position information of the object and the position of the marker associated with the object. When the color tones of the image around the display position of the object in the image in real space are complicated, it is difficult to visually recognize the overlaid object, thereby reducing effects, such as provision of various pieces of information, brought about by the displaying of the object.

The present invention is made in view of the above-mentioned problem. An object of the present invention is to provide an object display device and an object display method capable of overlaying and displaying an object at a position where it is easily visually recognized in an image in real space, in AR technology.

Solution to Problem

To solve the above-mentioned problem, an object display device according to an embodiment of the present invention overlays and displays an object at a predetermined position in an image in real space. The object display device includes object information acquisition means for acquiring object information about an object, image acquisition means for acquiring an image in real space, image analysis means for acquiring information about a size and color of the object that is acquired by the object information acquisition means and information about a color of the image in real space that is acquired by the image acquisition means, pattern extraction means for extracting a region where the object is easily visually recognized when the object is overlaid and displayed on the image in real space, from the image in real space, based on the information about the size and color of the object and the information about the color of the image in real space that are acquired by the image analysis means, display position correction means for correcting a display position of the object to the region extracted by the pattern extraction means, and display means for overlaying and displaying the object at the display position corrected by the display position correction means.

To solve the above-mentioned problem, an object display method according to an embodiment of the present invention is performed in an object display device that overlays and displays an object at a predetermined position in an image in real space. The object display method includes an object information acquisition step of acquiring object information about an object, an image acquisition step of acquiring an image in real space, an image analysis step of acquiring information about a size and color of a region that the object occupies in the image in real space that is acquired in the object information acquisition step and information about a color of the image in real space that is acquired in the image acquisition step, a pattern extraction step of extracting a region where the object is easily visually recognized when the object is overlaid and displayed on the image in real space, from the image in real space, based on the information about the size and color of the object and the information about the color of the image in real space that are acquired in the image analysis step, a display position correction step of correcting a display position of the object to the region extracted in the pattern extraction step, and a display step of overlaying and displaying the object at the display position corrected in the display position correction step.

With the object display device and the object display method according to an embodiment of the present invention, a region where an object is easily visually recognized when the object is overlaid and displayed on an image in real space is extracted from the image in real space, based on information about the size and color of the object and information about the color of the image in real space, and the display position of the object is corrected to this region. This facilitates visual recognition of the object, enhancing various effects brought about by the displaying of the object in the image in real space.

In the object display device according to an embodiment of the present invention, the pattern extraction means may extract a region having a size equal to or greater than the size of the object and having a single color from the image in real space.

In this case, a region extracted from the image in real space has a single color, and the display position of the object is corrected to this region. Accordingly, the object is overlaid and displayed at the region where color tones are not complicated in the image in real space, thereby facilitating visual recognition of the object.

In the object display device according to an embodiment of the present invention, the pattern extraction means may extract a region having a size equal to or greater than the size of the object and having color tones in a predetermined range from the image in real space.

In this case, a region extracted from the image in real space has color tones in a predetermined range, and the display position of the object is corrected to this region. Accordingly, the object is overlaid and displayed at the region where color tones are not complicated in the image in real space, thereby facilitating visual recognition of the object.

In the object display device according to an embodiment of the present invention, the pattern extraction means may extract a region having a size equal to or greater than the size of the object and including a section overlaid with an outer periphery of the object when the object is overlaid, the section having a single color, from the image in real space.

When an object is overlaid and displayed on an image in real space, the color of the section that cannot be visually recognized due to the object in the image in real space does not affect the visibility of the object. By contrast, the color of the section overlaid with the outer periphery of the object greatly affects the visibility of the object. In the object display device of the present invention, a region extracted from the image in real space includes a section overlaid with the outer periphery of the object when the object is overlaid that has a single color, and the display position of the object is corrected to this region. Accordingly, the object is overlaid and displayed such that the outer periphery thereof is located at the section where color tones are not complicated in the image in real space, thereby facilitating visual recognition of the object.

In the object display device according to an embodiment of the present invention, the pattern extraction means may extract a region having a size equal to or greater than the size of the object and including a section overlaid with an outer periphery of the object when the object is overlaid, the section having color tones in a predetermined range, from the image in real space.

In this case, a region extracted from the image in real space includes a section overlaid with the outer periphery of the object when the object is overlaid that has color tones in a predetermined range, and the display position of the object is corrected to this region. Accordingly, the object is overlaid and displayed such that the outer periphery thereof is located at the section where color tones are not complicated in the image in real space, thereby facilitating visual recognition of the object.

In the object display device according to an embodiment of the present invention, the pattern extraction means may extract a region having a size equal to or greater than the size of the object and including a section occupied by a single color at least a predetermined proportion from the image in real space.

In this case, a region extracted from the image in real space includes therein a single color at least a predetermined proportion, and the display position of the object is corrected to this region. Accordingly, the object is overlaid and displayed in the region where color tones are relatively not complicated in the image in real space, thereby facilitating visual recognition of the object.

In the object display device according to an embodiment of the present invention, the pattern extraction means may extract a region having a size equal to or greater than the size of the object and including a section having color tones in a predetermined range at least a predetermined proportion, from the image in real space.

In this case, a region extracted from the image in real space includes a section having color tones in a predetermined range at least a predetermined proportion, and the display position of the object is corrected to this region. Accordingly, the object is overlaid and displayed in the region where color tones are relatively not complicated in the image in real space, thereby facilitating visual recognition of the object.

In the object display device according to an embodiment of the present invention, the image analysis means may extract regions each having a single color or color tones in a predetermined range as display candidate regions from the image in real space acquired by the image acquisition means, and the pattern extraction means may extract a region where the object is easily visually recognized from the display candidate regions extracted by the image analysis means.

In this case, each display candidate region that is to be a candidate for a region to which the display position of the object is corrected is extracted in advance, and extraction of a region for display of the object is performed on the extracted display candidate regions. This reduces processing load for the extraction process.

In the object display device according to an embodiment of the present invention, the display position correction means may correct the display position of the object, based on the information about the color of the object that is acquired by the image analysis means and information about the color of the region extracted by the pattern extraction means, when the color of the object and the color of the region have a predetermined contrast relationship.

In this case, when the color tone of the region that is to be a background for the object and the color tone of the object have a contrast relationship, the display position of the object is corrected to this region, thereby facilitating visual recognition of the object.

In the object display device according to an embodiment of the present invention, when the pattern extraction means extracts a plurality of regions, the display position correction means may correct the display position of the object to a region closest to an original display position of the object.

Objects overlaid and displayed on images in real space are often associated with predetermined positions and include information related to the positions. In the object display device of the present invention, even though the display position is corrected for improvement in visibility, the display position is corrected to a region closest to the original display position of the object, thereby preventing reduction of informativeness of the object.

In the object display device according to an embodiment of the present invention, the object information may include position dependency indicating a degree of relevance to the display position of the object. The display position correction means may correct the display position of the object when the position dependency is lower than a predetermined degree.

A high position dependency of the object means a high relevance to the display position of the object so if the object is displayed at a position different from a predetermined position, the information provided by the object to the user is likely to be inappropriate. The configuration of the present invention corrects the display position of the object when the position dependency is lower than a predetermined degree, thereby preventing reduction of informativeness of the object.

Advantageous Effects of Invention

In AR technology, an object can be overlaid and displayed at a position where it is easily visually recognized in an image in real space.

BRIEF DESCRIPTION OF DRAWINGS

FIG. 3 is a diagram showing a configuration of an object database and an example of data stored therein.

FIG. 6 is a diagram showing the display position, number of squares required for display, and main color tone of an object acquired by an image analysis unit.

FIG. 8 is a diagram showing the number of squares, information about the squares, and main color tone for each display candidate region acquired by the image analysis unit.

FIG. 9 is a diagram showing examples of patterns related to regions extracted by a pattern extraction unit for correcting the display position of the object.

FIG. 10 is a diagram showing examples in which the object is overlaid and displayed on the image in real space and which show overlaid display before and after correction of the display position.

DESCRIPTION OF EMBODIMENTS

An embodiment of an object display device and an object display method according to the present invention will be described with reference to the figures. It is noted that the same parts are denoted with the same reference signs, if possible, and an overlapping description is omitted.

Figure 1:
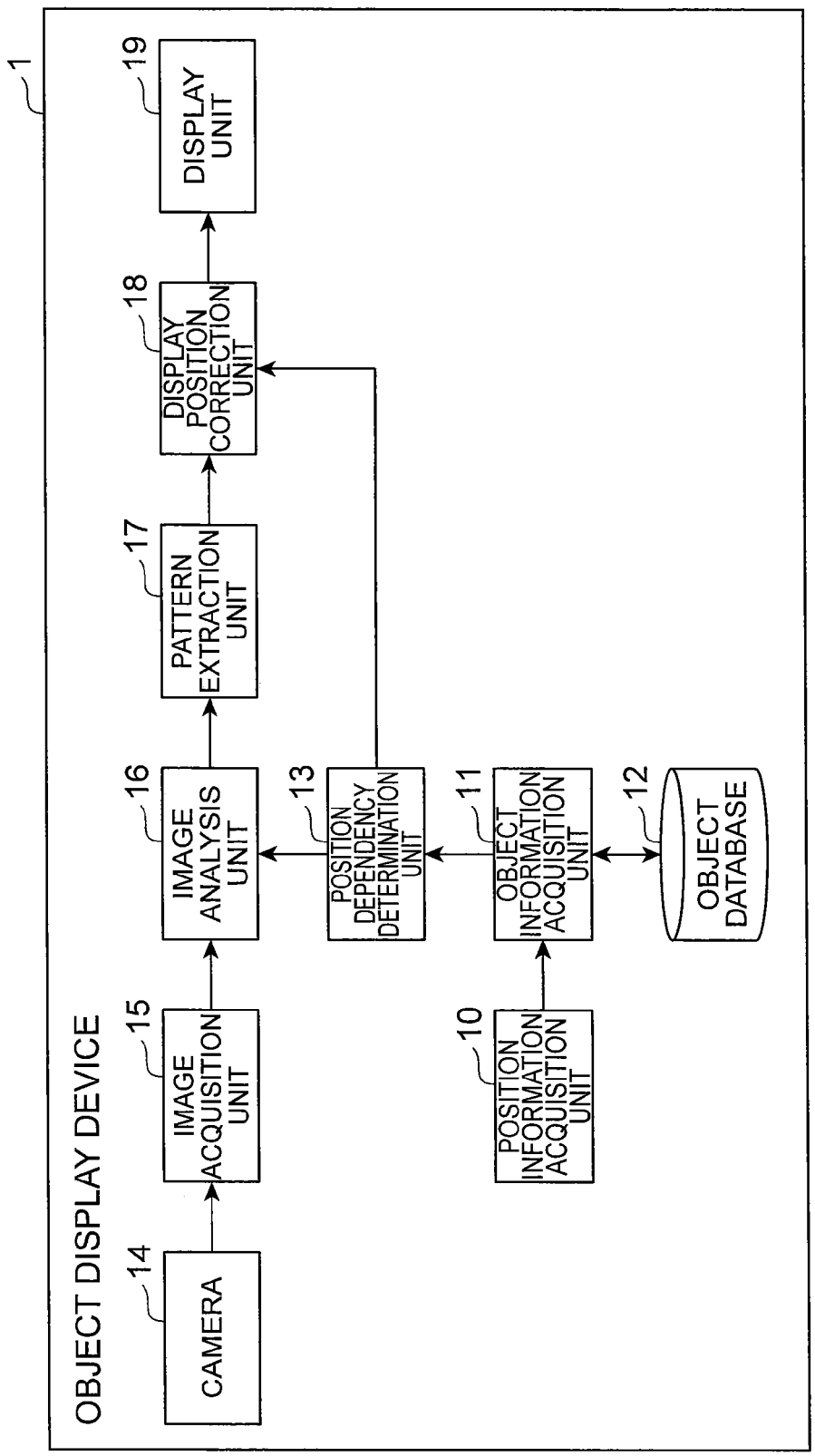
FIG. 1 is a block diagram showing a functional configuration of an object display device.

FIG. 1 is a block diagram showing a functional configuration of an object display device 1. The object display device 1 in the present embodiment is a device that overlays and displays an object at a predetermined position in an image in real space. The object display device 1 is, for example, a mobile terminal capable of communication via a mobile communication network.

Services based on AR technology using devices such as mobile terminals include the one detecting a predetermined marker from an image in real space acquired by a camera in a mobile terminal and overlaying an object associated with the marker on the image in real space to display the overlaid object on a display. Similar services include the one acquiring an object arranged around the location of a mobile terminal and overlaying and displaying the object in relation to the position in the image in real space acquired by a camera provided to the mobile terminal. The object display device 1 in the present embodiment corresponds to a device that receives services provided in the latter case, although not being limited thereto.

As shown in FIG. 1, the object display device 1 functionally includes a position information acquisition unit 10, an object information acquisition unit 11 (object information acquisition means), an object database 12, a position dependency determination unit 13, a camera 14, an image acquisition unit 15 (image acquisition means), an image analysis unit 16 (image analysis means), a pattern extraction unit 17 (pattern extraction means), a display position correction unit 18 (display position correction means), and a display unit 19 (display means).

Figure 2:
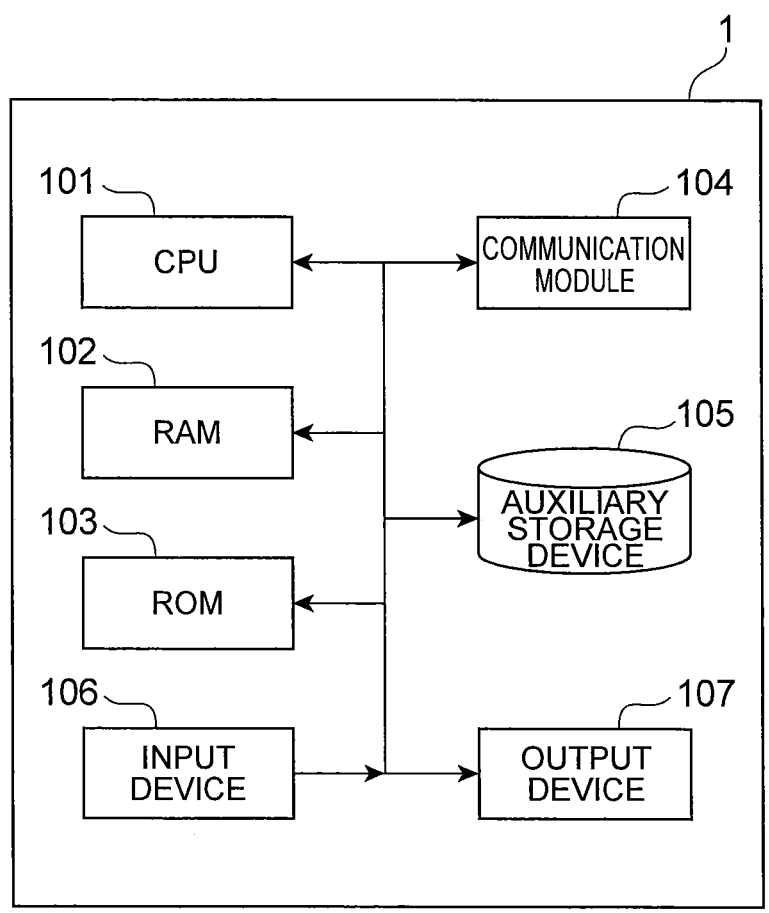
FIG. 2 is a hardware block diagram of the object display device.

FIG. 2 is a hardware configuration diagram of the object display device 1. As shown in FIG. 2, the object display device 1 is physically configured as a computer system mainly including a CPU 101, a RAM 102 and a ROM 103 as main storages, a communication module 104 that is a data transmission/reception device, an auxiliary storage device 105 such as a hard disk or a flash memory, an input device 106 such as a keyboard as an input device, and an output device 107 such as a display. Each function shown in FIG. 1 is implemented by reading predetermined computer software on the hardware such as the CPU 101 and the RAM 102 shown in FIG. 2 to bring the communication module 104, the input device 106, and the output device 107 into operation under the control of the CPU 101, and by reading and writing data from/into the RAM 102 or the auxiliary storage device 105. Referring to FIG. 1 again, each functional unit of the object display device 1 will be described in details.

The position information acquisition unit 10 is a unit that acquires position information indicating the location of the object display device 1. The location of the object display device 1 is measured, for example, by positioning means such as a GPS device. The position information acquisition unit 10 sends the position information to the object information acquisition unit 11.

The object information acquisition unit 11 is a unit that acquires object information about an object. Specifically, the object information acquisition unit 11 acquires object information about an object arranged around the location of the object display device 1 from the object database 12, based on the position information sent from the position information acquisition unit. The object information acquisition unit 11 sends the acquired object information to the position dependency determination unit 13 and the image analysis unit 16.

The object database 12 is storage means for storing object information. The object database 12 may store object information in advance. The object database 12 may accumulate object information that is acquired through predetermined communication means (not shown) from a server (not shown) storing and managing object information, based on the position information acquired by the position information acquisition unit 10. FIG. 3 is a diagram showing an example of the object information stored in the object database 12. As shown in FIG. 3, the object information includes data such as object data, position information, and position dependency associated with an object ID identifying an object.

The object data is image data of an object. The position information is information indicating the arrangement position of the object in real space and is represented, for example, by three-dimensional coordinate values. The position dependency is information indicating the degree of relevance to the display position of the object. In the present embodiment, the position dependency "1" indicates a high relevance to the display position, and the position dependency "0" indicates a low relevance to the display position. With the high position dependency, if the object is displayed at a place different from the original arrangement position indicated by the position information, information provided by the object is likely to be inappropriate.

The position dependency determination unit 13 is a unit that determines the relevance to the original position indicated by the position information of the object, based on the position dependency included in the object information. The position dependency determination unit 13 sends the determination result to the image analysis unit 16 and the display position correction unit 18.

The camera 14 is a device that captures an image in real space. The image acquisition unit 15 is a unit that acquires the image in real space captured by the camera 14. The image acquisition unit 15 sends the acquired image in real space to the image analysis unit 16.

The image analysis unit 16 is a unit that acquires information about the size and color of a region that the object occupies in the image in real space that is acquired by the object information acquisition unit 11 and information about the color of the image in real space that is acquired by the image acquisition unit 15. The processing performed by the image analysis unit 16 is described below in more details.

Figure 4:
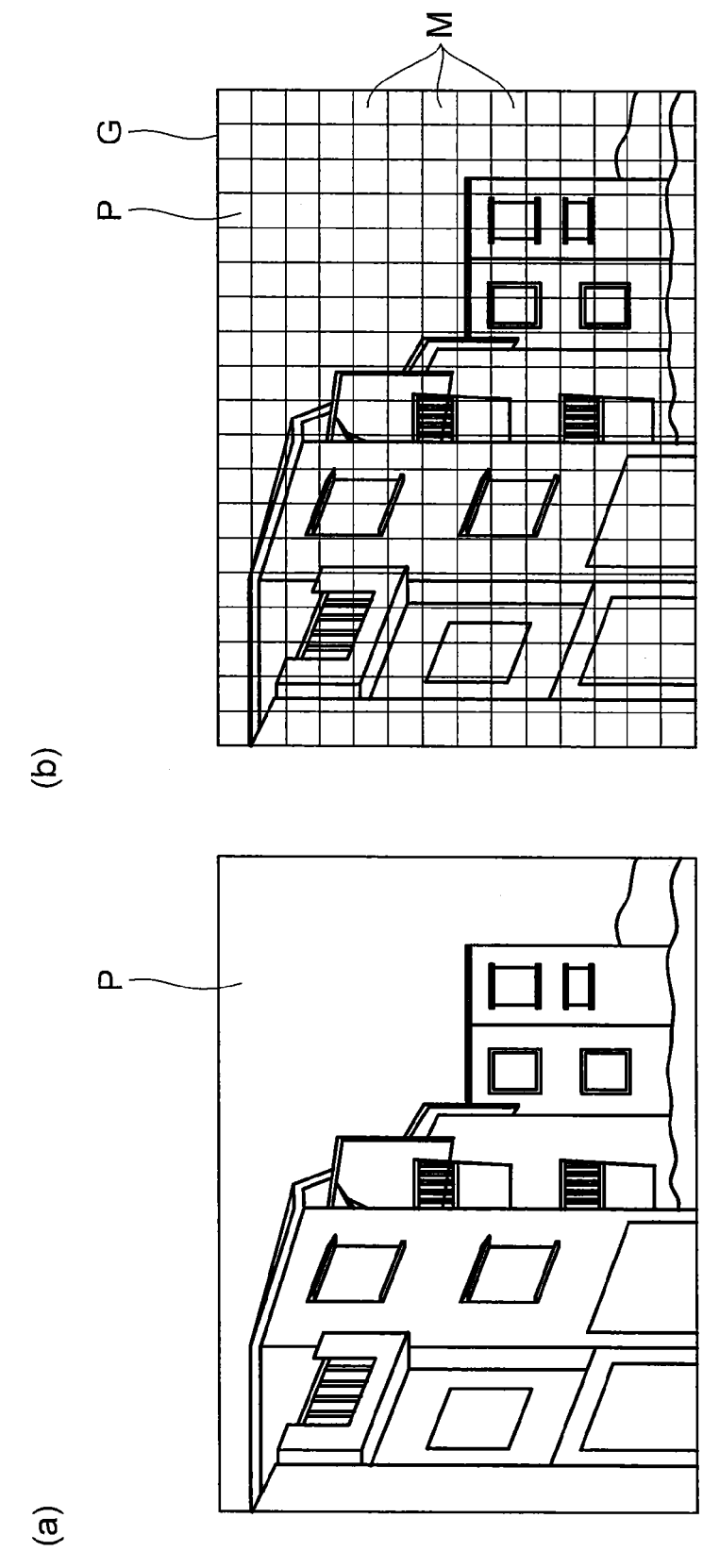
FIG. 4 is a diagram showing an example of an image in real space and a grid set in the image in real space.

The image analysis unit 16 sets a grid having a predetermined spacing in an image in real space. FIG. 4(a) is a diagram showing an example of an image P in real space. FIG. 4(b) is a diagram showing an example of a grid G set in the image P in real space shown in FIG. 4(a). As shown in FIG. 4(b), the image analysis unit 16 divides the image P in real space into squares M by setting the grid G. The image analysis unit 16 sets the spacing of the grid G at a predetermined size such that one or more pixels of the image in real space are included in one square M. The image analysis unit 16 then sets a color for each square M. The color for each square is set to a color such as the color that the greatest number of pixels have among the colors of the pixels included in the square M or the average color of the pixels included in the square M. In this manner, a single color is set for each square M, whereby the image P in real space is subjected to mosaic processing.

Figure 5:
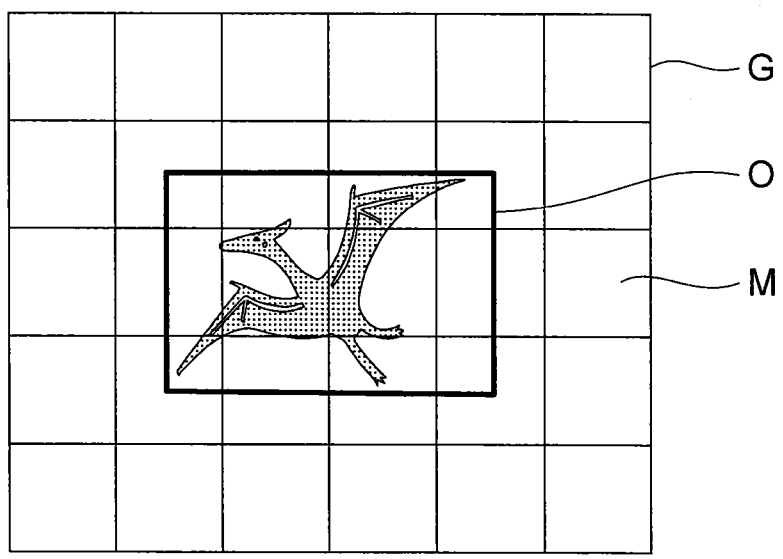
FIG. 5 is a diagram showing the number of squares required to display an object.

The image analysis unit 16 acquires information about the size and color of the region that the object occupies in the image in real space. More specifically, the image analysis unit 16 compares the size of image data of the object to be displayed with the sizes of the grid G and the squares M set in the image P in real space and determines the size and number of squares of the region required to overlay and display the object on the image in real space. FIG. 5 is a diagram showing an example in which the object O to be displayed in the present embodiment is overlaid on the grid G and the squares M set in the image P in real space. As shown in FIG. 5, in order to display the object O, a rectangular region formed of squares in three columns and four rows is required. The image analysis unit 16 temporarily stores information of the size and number of squares of the region required to overlay and display the object O on the image in real space, as illustrated in FIG. 5.

The image analysis unit 16 acquires a main color tone that is the primary color tone of the object O. The image analysis unit 16 acquires, as a main color tone, for example, a color such as the color that the greatest number of pixels have among the colors of the pixels included in the object O or the average color of the pixels included in the object O. The image analysis unit 16 temporarily stores information about the acquired main color tone. FIG. 6 is a diagram showing an example of information of the size and number of squares of the region required to overlay and display the object O on the image in real space and information about the main color tone of the object O that are temporarily stored by the image analysis unit 16. As shown in FIG. 6, the image analysis unit 16 stores information such as the display position, the number of display squares, and the main color tone associated with the object ID. The display position is information indicating the arrangement position of the object and indicates the position where the representative point of the object is arranged. This display position is similar to the position information in the object information shown in FIG. 3. The number of display squares is information indicating the size and number of squares of the region required to overlay and display the object O on the image in real space. The example shown in FIG. 6 illustrates that a rectangular region formed of squares in three columns and four rows is required to display the object O. The main color tone is information indicating the main color tone of the object O and, in the present embodiment, is indicated by data in RGB representation, for example.

The image analysis unit 16 extracts a display candidate region for correcting the display position of the object from the image P in real space divided into squares M. The image analysis unit 16 extracts, for example, a region constituted with a single color as a display candidate region from the image P in real space divided into squares M. In other words, all the squares M included in the display candidate region thus extracted have a single color. The image analysis unit 16 may extract a region constituted with similar colors as a display candidate region from the image P in real space divided into squares M. The similar colors in the present embodiment are defined as the group of colors whose color tones are included in a predetermined range. As a more specific example, when the color of each square M is represented in the RGB representation format, the image analysis unit 16 can refer to the respective predetermined higher-order bits of the R, G, and B values representing the color of each square M and extract the region constituted with the squares M whose higher-order bits referred to match, as a display candidate region. The colors of all the squares M thus extracted are included in color tones in a predetermined range.

Figure 7:
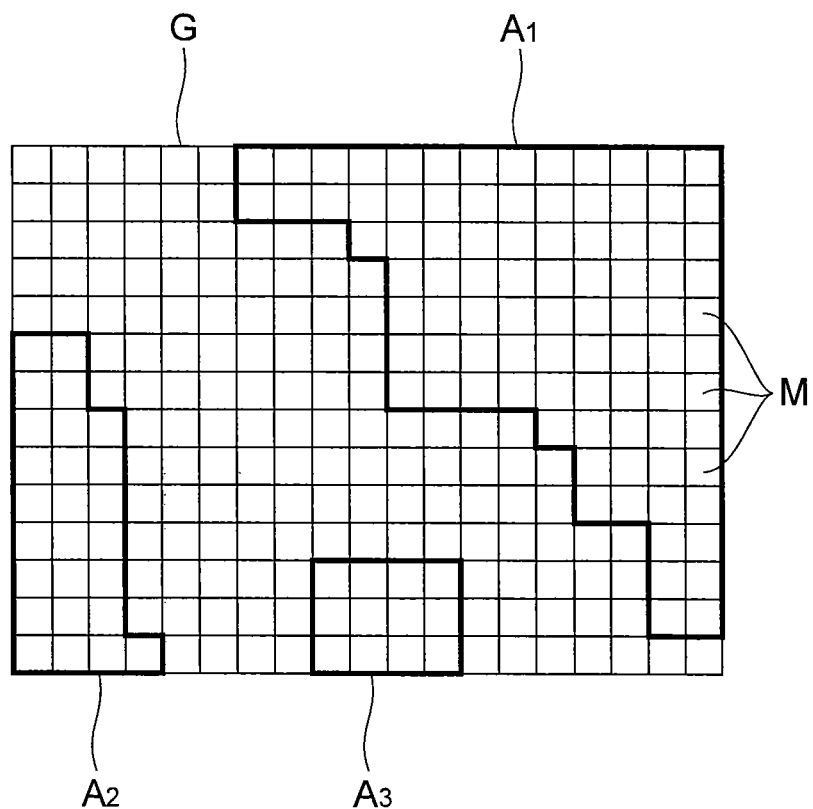
FIG. 7 is a diagram showing an example of a display candidate region extracted from an image in real space.

The image analysis unit 16 temporarily stores information about the extracted display candidate region. FIG. 7 is a diagram showing an example of the display candidate region extracted by the image analysis unit 16. As shown in FIG. 7, display candidate regions $A_1$, $A_2$, and $A_3$ are extracted from the image P in real space in which the grid G has been set. FIG. 8 is a diagram showing an example of information about the display candidate regions temporarily stored by the image analysis unit 16. As shown in FIG. 8, the image analysis unit 16 stores region information and a main color tone associated with a display candidate region ID identifying a display candidate region, as information about the display candidate region. The region information includes the number N of squares M constituting the display candidate region A and information R specifying the squares M. The information R specifying the squares M may be the group of coordinates of all the squares M located on the outer periphery of the display candidate region A or may be the group of coordinates of all the squares M included in the display candidate region A. The main color tone is the primary color tone of the display candidate region A. The image analysis unit 16 acquires, as a main color tone, for example, a color such as the color that the greatest number of squares M have among the colors of the squares M included in the display candidate region A or the average color of the squares M included in the display candidate region A, and temporarily stores the acquired color. The image analysis unit 16 sends information about the size and main color tone of the region that the object O occupies in the image in real space, and information about the display candidate region A to the pattern extraction unit 17.

The pattern extraction unit 17 is a unit that extracts a region where an object is easily visually recognized when the object is overlaid and displayed on the image in real space, from the image in real space, based on the information about the size and color of the object O and the information about the color of the image in real space that are acquired by the image analysis unit 16. The processing performed by the pattern extraction unit 17 is described more specifically with reference to FIG. 9. FIG. 9 is a diagram showing examples of the extracted pattern extracted from the display candidate region A.

In the present embodiment, the pattern extraction unit 17 extracts a region having the size equal to or greater than the size of the object O and having a single color, as an extracted pattern from the display candidate region A. A rectangular region formed of squares M in three columns and four rows is required to display the object O in the present embodiment. The pattern extraction unit 17 therefore extracts a region $R_1$ constituted with squares M having a single color as an extracted pattern from the display candidate region A, as shown in FIG. 9(a).

The pattern extraction unit 17 may extract a region having the size equal to or greater than the size of the object O and having color tones in a predetermined range, as an extracted pattern from the display candidate region A. In this case, if the colors of all the squares included in the region $R_1$ have color tones in a predetermined range, the pattern extraction unit 17 extracts the region $R_1$ as an extracted pattern from the display candidate region A.

When the object O is overlaid on the image in real space, the color tone of the section that is hidden under the object O and cannot be visually recognized in the image in real space does not affect the visibility of the object O. By contrast, the color tone of the section overlaid with the outer periphery of the object O in the image in real space affects the visibility of the object O. For this reason, the pattern extraction unit 17 may extract a region having the size equal to or greater than the object O and including a section overlaid with the outer periphery of the object O when the object O is overlaid has a single color, as an extracted pattern from the display candidate region A. When the object O shown in FIG. 5 is overlaid on the image in real space, the object O requires a rectangular region formed of squares M in three columns and four rows, and the outer periphery of the object O is overlaid on the hatched squares M in a region $R_2$ as shown in FIG. 9(b). In this case, if, of the squares M included in the region $R_2$, all the hatched squares M have a single color, the pattern extraction unit 17 extracts this region $R_2$ as an extracted pattern from the display candidate region A.

The pattern extraction unit 17 may extract a region having the size equal to or greater than the size of the object O and including a section overlaid with the outer periphery of the object O when the object O is overlaid has color tones in a predetermined range, as an extracted pattern from the display candidate region A. In this case, if, of the squares M included in the region $R_2$, the colors of all the hatched squares M have color tones in a predetermined range, the pattern extraction unit 17 extracts this region $R_2$ as an extracted pattern from the display candidate region A.

When the object O is overlaid on the image in real space, it is expected that the visibility of the object O be improved as a region overlaid with the object O and occupied by a single color increases in the image in real space. For this reason, the pattern extraction unit 17 may extract a region having the size equal to or greater than the size of the object O and including a section occupied by a single color is included in at least a predetermined proportion, as an extracted pattern from the display candidate region A. Specifically, in the case where a rectangular region formed of squares M in three columns and four rows is required to display the object O in the present embodiment, if the hatched squares M having a single color make up at least a predetermined proportion of the squares M included in a rectangular region $R_3$ formed of squares M in three columns and four rows, as shown in FIG. 9(c), the pattern extraction unit 17 extracts the region $R_3$ as an extracted pattern from the display candidate region A.

The pattern extraction unit 17 may extract a region having the size equal to or greater than the object O and including a section having color tones in a predetermined range is included in at least a predetermined proportion, as an extracted pattern from the display candidate region A. Specifically, in the case where a rectangular region formed of squares M in three columns and four rows is required to display the object O in the present embodiment, if the hatched squares M having color tones in a predetermined range make up at least a predetermined proportion of the squares M included in the rectangular region $R_3$ formed of squares M in three columns and four rows, as shown in FIG. 9(c), the pattern extraction unit 17 extracts the region $R_3$ as an extracted pattern from the display candidate region A.

The display position correction unit 18 is a unit that corrects the display position of the object O to the extracted pattern extracted by the pattern extraction unit 17. Specifically, in the case where the original display position of the object O is set or stored as position information in the object database 12, for example, the display position correction unit 18 changes the display position of the object O from the original display position to the position of the extracted pattern extracted by the pattern extraction unit 17.

If a plurality of extracted patterns are extracted by the pattern extraction unit 17, the display position correction unit 18 may correct the display position of the object O to the region closest to the original display position of the object O. In some cases, the pattern extraction unit 17 may extract a plurality of extracted patterns as candidates for the display position for improvement in visibility of the object O. In this case, the display position correction unit 18 corrects the display position of the object O to the region closest to the original display position of the object O. The object O is displayed in relation to a predetermined position to provide various pieces of information related to its arrangement position. Even though the display position is corrected for improvement in visibility, the display position is corrected to the region closest to the original display position of the object O, thereby preventing reduction of informativeness of the object O.

The display position correction unit 18 may correct the display position of the object O when the color tone of the object O and the color tone of the extracted pattern have a predetermined contrast relationship, based on the information about the color of the object O acquired by the image acquisition unit 16 and the information about the color of the extracted pattern extracted by the pattern extraction unit 17. For example, when the color tone of the object O resembles the color tone of the extracted pattern, the visibility of the object O is less improved even if the display position of the object O is corrected to the position of the extracted pattern. Accordingly, when the color tone of the object O and the color tone of the extracted pattern have a predetermined contrast relationship, correction of the display position of the object O is made, thereby facilitating visual recognition of the object O. The determination of the contrast between the color tones can be performed using a well-known hue circle. Specifically, the colors at the position opposite to the main color tone of the object O and on the periphery thereof in a hue circle are extracted as contrast colors. Then, if the main color tone of the extracted pattern corresponds to the contrast colors, the display position correction unit 18 makes correction of the display position of the object O. The range of contrast colors is preset.

The display position correction unit 18 acquires the determination result as to the degree of relevance position dependency to the original display position of the object O that is sent from the position dependency determination unit 13. The display position correction unit 18 may make correction of the display position of the object O when the position dependency of the object O is lower than a predetermined degree. A high position dependency of the object O means that the relevance to display position of the object O is high, so if the object O is displayed at a position different from the original display position, the information provided by the object O to the user is likely to be inappropriate. In the present embodiment, the display position of the object O is corrected when the position dependency is lower than a predetermined degree, thereby preventing reduction of informativeness of the object O.

The display unit 19 is a unit that overlays and displays the object O on the image in real space at the display position corrected by the display position correction unit 18. FIG. 10(*a*) shows an example in which the object is overlaid and displayed on the image in real space before correction of the display position. FIG. 10(*b*) shows an example in which the object is overlaid and displayed on the image in real space after correction of the display position. As shown in FIG. 10(*a*), when the color tones of the region where the object $O_A$ is overlaid and displayed in the image in real space are complicated, the visibility of the object $O_A$ is low. By contrast, as shown in FIG. 10(*b*), in the present embodiment, the display position of the object $O_B$ is corrected to the region where color tones are not complicated in the image in real space, resulting in good visibility of the object $O_B$.

Figure 11:
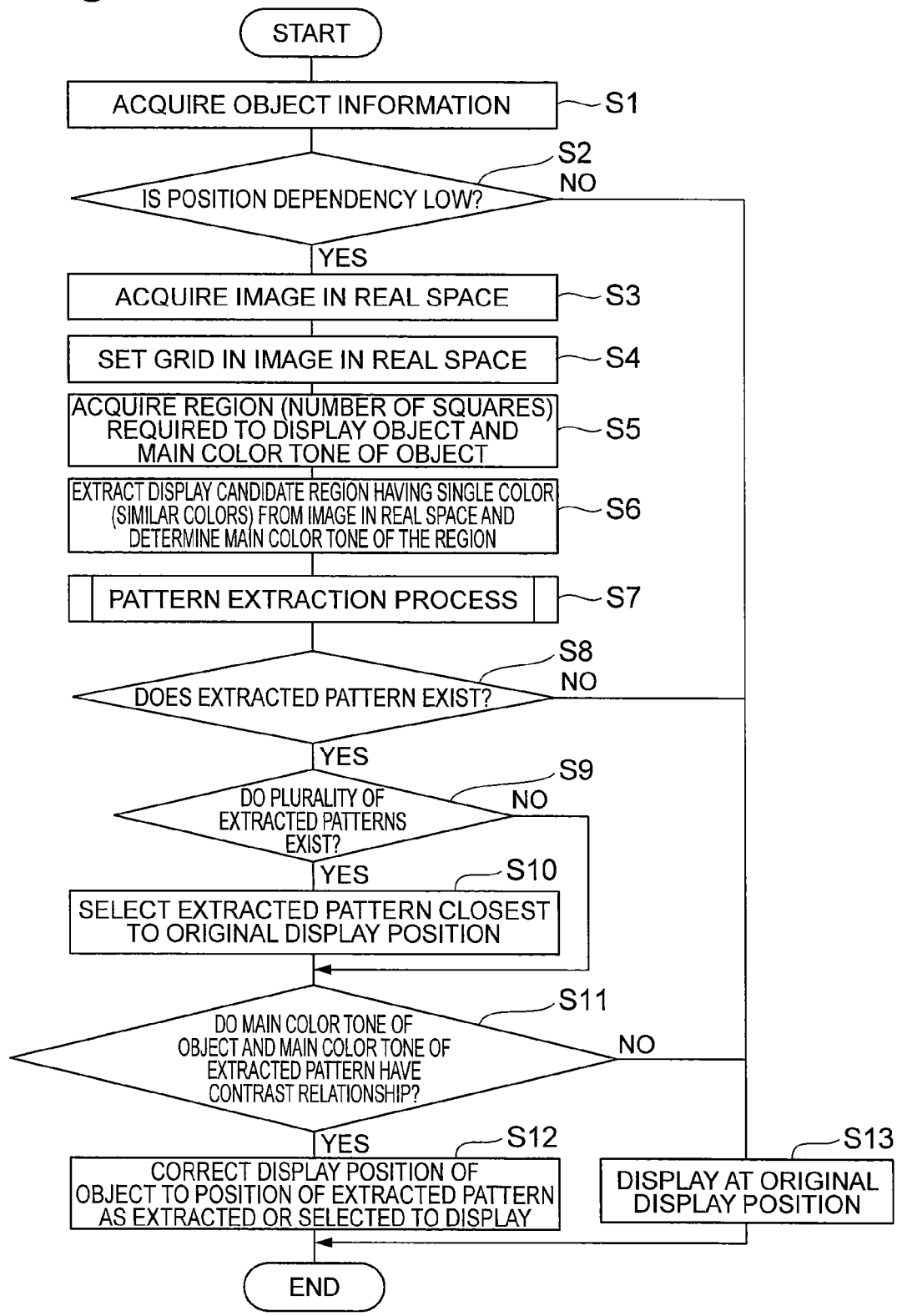
FIG. 11 is a timing chart showing processing of an object display method.
Figure 12:
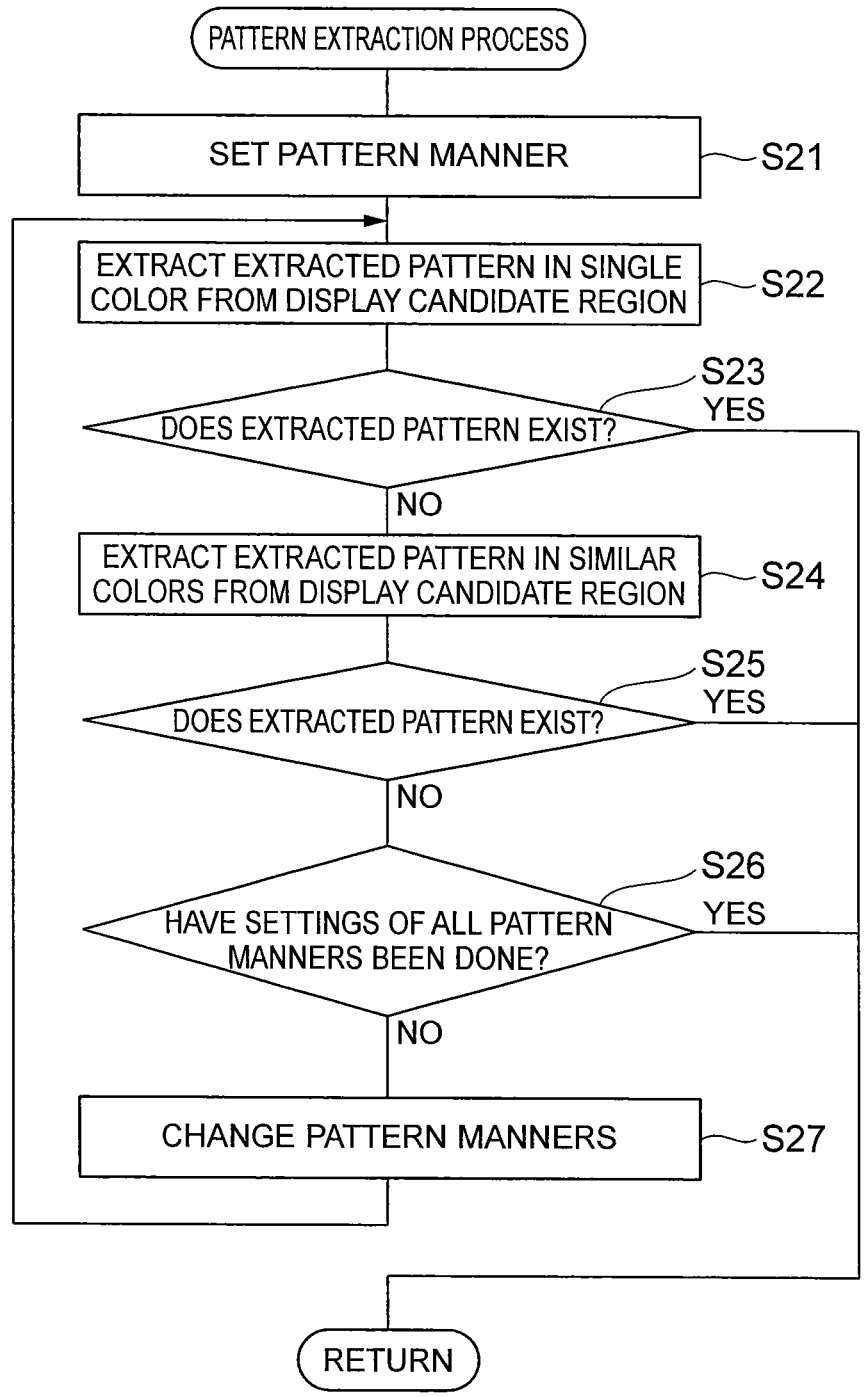
FIG. 12 is a flowchart showing processing of a pattern extraction process in FIG. 11.

The operation of the object display device 1 with the object display method in the present embodiment is described with reference to FIG. 11 and FIG. 12. FIG. 11 is a timing chart showing processing of the object display method. FIG. 12 is a flowchart showing processing of the pattern extraction process in FIG. 11.

First, the object information acquisition unit 11 acquires object information (S1, the object information acquisition step). The position dependency determination unit 13 determines the relevance to the original arrangement position indicated by the position information of the object, based on the position dependency included in the object information (S2). If it is determined that the position dependency is low, the process procedure proceeds to step S3. If it is not determined that the position dependency is low, the process procedure proceeds to step S13.

In step S3, the image acquisition unit 15 acquires an image in real space captured by the camera 14 (S3, the image acquisition step). The image analysis unit 16 then sets a grid having a predetermined spacing in the image in real space (S4). The setting of the grid divides the image in real space into squares. The image analysis unit 16 then sets a color for each square.

The image analysis unit 16 then acquires the size of a region (the number of squares) required to overlay and display the object on the image in real space by comparing the size of image data of the object to be displayed with the sizes of the grid and the squares set in the image in real space (S5, the image analysis unit). The image analysis unit 16 then acquires the main color tone that is the primary color tone of the object O (S5, the image analysis step).

The image analysis unit 16 extracts a display candidate region for correcting the display position of the object, from the image P in real space divided into squares M (S6, the image analysis step). The display candidate region is, for example, a region constituted with squares having a single color or a region constituted with squares having similar colors. The image analysis unit 16 determines the main color tone of the extracted display candidate region (S6, the image analysis step). The processing shown in step S6 is not essential processing in the present embodiment. Specifically, the object display device 1 in the present embodiment may perform the pattern extraction process described later not on the display candidate region but on the image in real space without extracting a display candidate region.

The pattern extraction unit 17 then performs the pattern extraction process (S7, the pattern extraction step). The pattern extraction process is described in details with reference to FIG. 12.

The pattern extraction unit 17 sets a pattern manner of the extracted pattern (S21). For example, pattern manners listed below are successively set with a square set in step S4 as one unit (i) all the squares included in a region having the size required to overlay and display the object;

(ii) of all the squares included in a region having the size required to overlay and display the object, the squares overlaid with the outer periphery of the object; and (iii) of all the squares included in a region having the size required to overlay and display the object, at least a predetermined proportion or number of squares.

In the present embodiment, in step S21, the pattern extraction unit 17 sets the pattern (i) as a pattern manner.

The pattern extraction unit 17 attempts to extract a region having the size required to overlay and display the object and being constituted with squares having a single color, as an extracted pattern from the display candidate region (S22). If an extracted pattern is extracted in step S22, the process procedure ends (S23). If an extracted pattern is not extracted in step S22, the process procedure proceeds to step S24 (S23).

In step S24, the pattern extraction unit 17 attempts to extract a region having the size required to overlay and display the object and being constituted with squares having similar colors, as an extracted pattern from the display candidate region (S24). It is noted that the similar colors are defined as the group of colors having color tones in a predetermined range. If an extracted pattern is extracted in step S24, the process procedure ends (S25). If an extracted pattern is not extracted in step S24, the process procedure proceeds to step S26 (S25).

In step S26, the pattern extraction unit 17 determines whether the settings of all the pattern manners have been done (S26). In the present embodiment, it is determined whether the setting has been done for each of the pattern manners (i) to (iii) as described above. If it is determined that the settings of all the pattern manners have been done, the process procedure ends. If it is not determined that the settings of all the pattern manners have been done, the process procedure proceeds to step S27. For example, when pattern extraction is performed with the pattern manner (i) being set, pattern extraction with the pattern manners (ii) and (iii) is not performed. In this case, it is not determined that the settings of all the pattern manners have been done.

In step S27, the pattern extraction unit 17 changes pattern manners. Specifically, the pattern extraction unit 17 successively changes the pattern manners so as to increase the possibility that an extracted pattern is extracted. More specifically, the possibility that an extracted pattern is extracted with the pattern manners as described above is the lowest with the pattern manner (i) and the highest with the pattern manner (iii). Therefore, when pattern extraction is performed with the pattern manner (i) being set, the pattern extraction unit 17 changes the pattern manner to (ii).

After the processing in step S27 is performed, the process procedure returns to step S22. In this way, the processing in step S22 to S27 is repeated with the pattern manners being changed. The pattern extraction unit 17 sends information about the extracted pattern extracted or information indicating that an extracted pattern is not extracted, to the display position correction unit 18.

Referring to FIG. 11 again, in step S8, the display position correction unit 18 determines whether there exists an extracted pattern (S8). If it is determined that there exists an extracted pattern, the process procedure proceeds to step S9. If it is not determined that there exists an extracted pattern, the process procedure proceeds to step S13.

The display position correction unit 18 then determines whether there exist a plurality of extracted patterns (S9). If it is determined that there exist a plurality of extracted patterns, the process procedure proceeds to step S10. If it is not determined that there exist a plurality of extracted patterns, the process procedure proceeds to step S11.

In step S10, the display position correction unit 18 selects the extracted pattern located closest to the original display position of the object (S10). The display position correction unit 18 then determines whether the main color tone of the selected extracted pattern corresponds to a predetermined contrast color to the main color tone of the object (S11). If it is determined that the main color tone of the extracted pattern corresponds to a predetermined contrast color to the main color tone of the object, the process procedure proceeds to step S12. If it is not determined that the main color tone of the extracted pattern corresponds to a predetermined contrast color to the main color tone of the object, the process procedure proceeds to step S13.

In step S12, the display position correction unit 18 corrects the display position of the object to the extracted pattern extracted by the pattern extraction unit 17. The display unit 19 then overlays and displays the object at the display position corrected by the display position correction unit 18 in the image in real space (S12, the display position correction step, the display step).

In step S13, the display unit 19 overlays and displays the object at the original arrangement position indicated by the position information of the object, without correcting the display position of the object (S13). The process in the present embodiment thus ends.

If it is not determined that there exists an extracted pattern in step S8, or if it is not determined that the main color tone of the extracted pattern corresponds to a predetermined contrast color to the main color tone of the object in step S11, the process procedure may return to step S4. In the case where the process procedure returns to step S4 in this manner, the processing after step S4 is repeated with the conditions of setting a grid in step S4 or the conditions of extracting a display candidate region in step S6 being changed so as to increase the possibility that an extracted pattern is extracted. For example, in step S4, the conditions of setting a grid can be changed so as to increase the spacing of the grid and to increase the size of the square formed in the grid, thereby increasing the possibility that an extracted pattern is extracted. In step S6, the conditions of extracting a display candidate region can be changed so as to expand the range of color tones with which similar colors are determined, thereby increasing the possibility that an extracted pattern is extracted.

In the object display device 1 and the object display method in the present embodiment as described above, the pattern extraction unit 17 extracts a region where an object is easily visually recognized when the object is overlaid and displayed in an image in real space, from the image in real space, based on information about the size and color of the object and information about the color of the image in real space that are acquired by the image analysis unit 16, and the display position correction unit 18 corrects the display position of the object to this region. This facilitates visual recognition of the object and enhances various effects, such as informativeness, brought about by the displaying of the object in the image in real space.

The present invention has been described in details above based on an embodiment thereof. However, the present invention is not limited to the foregoing embodiment. The present invention is susceptible to various modifications in a range that does not deviate from the spirit of the invention.

INDUSTRIAL APPLICABILITY

The present invention allows an object to be overlaid and displayed at a position where it is easily visually recognized in an image in real space, in AR technology.

REFERENCE SIGNS LIST

1 . . . object display device, 10 . . . position information acquisition unit, 11 . . . object information acquisition unit, 12 . . . object database, 13 . . . position dependency determination unit, 14 . . . camera, 15 . . . image acquisition unit, 16 . . . image analysis unit, 17 . . . pattern extraction unit, 18 . . . display position correction unit, 19 . . . display unit, A, $A_1$, $A_2$ . . . display candidate region, G . . . grid, M . . . square, O . . . object.

The invention claimed is:

1. An object display device overlaying and displaying an object at a predetermined position in an image in real space, the object display device comprising:
   processing circuitry configured to
      acquire object information about an object,
      acquire an image in real space;
      acquire information about a size and color of the acquired object and information about a color of the acquired image in real space,
      analyze the image and extract a region from the image in real space, based on the acquired information about the size and color of the object and the acquired information about the color of the image in real space by determining a region having a size equal to or greater than the size of the object and including a section overlaid with an outer periphery of the object when the object is overlaid onto the image in real space and the section not including a portion of the region that is hidden by the object when the object is overlaid onto the image in real space, the section having color tones in a predetermined range which have a predetermined contrast relationship to a color of the object, and
      correct a display position of the object to the extracted region; and
   a display configured to overlay and display the object at the corrected display position.

2. The object display device according to claim 1, wherein the processing circuitry extracts a region having a size equal to or greater than the size of the object and having a single color from the image in real space.

3. The object display device according to claim 1, wherein the processing circuitry extracts a region having a size equal to or greater than the size of the object and having color tones in a predetermined range from the image in real space.

4. The object display device according to claim 1, wherein the processing circuitry is further configured to extract a region from the image in real space by determining a region having a size equal to or greater than the size of the object and including a section overlaid with an outer periphery of the object when the object is overlaid onto the image in real space and the section not including a portion of the region that is hidden by the object when the object is overlaid onto the image in real space, the section having a single color which has a predetermined contrast relationship to a color of the object.

5. The object display device according to claim 1, wherein processing circuitry is further configured to extract a region from the image in real space having a size equal to or greater than the size of the object and including a section occupied by a single color at least a predetermined proportion in area from the image in real space.

6. The object display device according to claim 1, wherein the processing circuitry is further configured to extract a region having a size equal to or greater than the size of the object and including a section having color tones in a predetermined range at least a predetermined proportion in area from the image in real space.

7. The object display device according to claim 1, wherein
the processing circuitry is further configured to extract regions from the image in real space each having a single color or color tones in a predetermined range as display candidate regions from the acquired image in real space, and
the processing circuitry extracts a region from the image in real space having a predetermined contrast relationship with the object from the extracted display candidate regions.

8. The object display device according to claim 1, wherein when the processing circuitry is further configured to extract a plurality of regions from the image in real space, the processing circuitry corrects the display position of the object to a region closest to an original display position of the object.

9. The object display device according to claim 1, wherein
the object information includes position dependency indicating a degree of relevance to the display position of the object, and
the processing circuitry corrects the display position of the object when the position dependency is lower than a predetermined degree.

10. An object display method performed in an object display device that overlays and displays an object at a predetermined position in an image in real space, the object display method comprising:
acquiring, by processing circuitry of the object display device, object information about an object;
acquiring, by the processing circuitry, an image in real space;
acquiring, by the processing circuitry, information about a size and color of the acquired object and information about a color of the acquired image in real space;
analyzing the image and extracting, by the processing circuitry, a region from the image in real space, based on the acquired information about the size and color of the object and the acquired information about the color of the image in real space by determining a region having a size equal to or greater than the size of the object and including a section overlaid with an outer periphery of the object when the object is overlaid onto the image in real space and the section not including a portion of the region that is hidden by the object when the object is overlaid onto the image in real space, the section having color tones in a predetermined range which have a predetermined contrast relationship to a color of the object;
correcting, by the processing circuitry, a display position of the object to the extracted region; and
displaying and overlaying, by a display, the object at the corrected display position.

11. A non-transitory computer-readable recording medium for storing therein a computer program that includes instructions which when executed by an object display device that overlays and displays an object at a predetermined position in an image in real space causes the object display device to execute a method comprising:
acquiring, by processing circuitry of the object display device, object information about an object;
acquiring, by the processing circuitry, an image in real space;
acquiring, by the processing circuitry, information about a size and color of the acquired object and information about a color of the acquired image in real space;
analyzing the image and extracting, by the processing circuitry, a region from the image in real space, based on the acquired information about the size and color of the object and the acquired information about the color of the image in real space by determining a region having a size equal to or greater than the size of the object and including a section overlaid with an outer periphery of the object when the object is overlaid onto the image in real space and the section not including a portion of the region that is hidden by the object when the object is overlaid onto the image in real space, the section having color tones in a predetermined range which have a predetermined contrast relationship to a color of the object;
correcting, by the processing circuitry, a display position of the object to the extracted region; and
displaying and overlaying, by a display, the object at the corrected display position.

12. The object display device according to claim 1, wherein the processing circuitry extracts the region from the image in real space by dividing the image into M square regions, M being an integer value, and determining a portion of the M squares having a size equal to or greater than the size of the object, and the section overlaid with an outer periphery of the object corresponds to the outermost M squares of the determined portion of the M squares.

* * * * *